US007221288B2

(12) United States Patent
Fitzgibbon et al.

(10) Patent No.: US 7,221,288 B2
(45) Date of Patent: May 22, 2007

(54) METHOD AND APPARATUS FOR USING OPTICAL SIGNAL TIME-OF-FLIGHT INFORMATION TO FACILITATE OBSTACLE DETECTION

(75) Inventors: James J. Fitzgibbon, Batavia, IL (US); Robert J. Olmsted, Wood Dale, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 226 days.

(21) Appl. No.: 10/972,922

(22) Filed: Oct. 25, 2004

(65) Prior Publication Data

US 2006/0086895 A1 Apr. 27, 2006

(51) Int. Cl.

| | |
|---|---|
| ***G08G 1/01*** | (2006.01) |
| ***G08G 13/08*** | (2006.01) |
| ***G06M 7/00*** | (2006.01) |
| ***H01J 40/14*** | (2006.01) |
| ***G01N 15/06*** | (2006.01) |

(52) U.S. Cl. ................ 340/933; 340/545.1; 340/545.3; 250/221; 250/573; 250/575; 250/578.1

(58) Field of Classification Search ................ 340/933, 340/545.1, 545.3, 552, 555–557, 686.1, 5.71; 250/221, 222.1, 573–575, 578.1, 559.37, 250/559.38; 382/103

See application file for complete search history.

(56) References Cited

U.S. PATENT DOCUMENTS

| | | | | |
|---|---|---|---|---|
| 5,233,185 | A * | 8/1993 | Whitaker | 250/222.1 |
| 6,115,128 | A * | 9/2000 | Vann | 356/623 |
| 6,455,839 | B1 * | 9/2002 | O'Connor et al. | 250/221 |
| 6,975,203 | B2 * | 12/2005 | Brookbank et al. | 340/5.26 |
| 2005/0133699 | A1 * | 6/2005 | Miremadi | 250/221 |
| 2005/0207616 | A1 * | 9/2005 | Brad et al. | 382/103 |

OTHER PUBLICATIONS

Albright, Peggy. "Consumer Virtual Keyboards May Have Industrial Appeal" Jun. 2, 2003: 2pg Design and News + Product Design and Development Jun. 12, 2003. <http://www.manufacturing.net/dn/index.asp?layout=articlePrint&articleID=CA299837>.

* cited by examiner

*Primary Examiner*—Toan N. Pham
(74) *Attorney, Agent, or Firm*—Fitch, Even, Tabin & Flannery

(57) ABSTRACT

One or more optical signals (wherein at least some of a plurality of optical signals are at different angles of travel with respect to one another and are directed towards an area comprising a movable barrier-controlled point of passage) create reflections when striking passageway boundaries as correspond to a given movable barrier. Obstacles in the pathway also give rise to reflections. By determining a time-of-flight for such reflections, one can detect a likely presence of an obstacle in such a pathway. Pursuant to one approach, such time-of-flight information can further provide information regarding a likely size of such an obstacle.

59 Claims, 7 Drawing Sheets

METHOD AND APPARATUS FOR USING OPTICAL SIGNAL TIME-OF-FLIGHT INFORMATION TO FACILITATE OBSTACLE DETECTION

TECHNICAL FIELD

This invention relates generally to movable barrier operators and more particularly to obstacle detection.

BACKGROUND

Movable barrier operators of various kinds are known in the art. Such operators typically serve to effect the selective and controlled movement of a corresponding movable barrier. Various kinds of movable barriers are known, including but not limited to single panel and segmented garage doors, horizontally or vertically pivoting or sliding doors or gates, cross arms, rolling shutters and the like. In general, such movable barriers are selectively moved as between two primary positions (usually a fully opened position and a fully closed position).

For various reasons an obstacle can become positioned in the pathway of such a movable barrier. For example, the rear-end of a vehicle that has not been completely disposed within a garage can extend into the path of travel of a garage door. Automated movement of a garage door under such circumstances can lead to damage of both the vehicle and the garage door and/or the movable barrier operator mechanism itself. As another example, a child or pet may move into the path of a closing movable barrier and risk injury.

Modern movable barrier operators typically make use of one or more techniques to facilitate automated detection of such obstacles. Common techniques include the use of an infrared beam disposed to likely detect the presence, when the beam is broken, of an obstacle in the pathway of the movable barrier. At least one difficulty associated with this technique is a requirement of having an emitter and detector on opposing sides of the movable barrier. This requires both mounting facilities for both sides of the movable barrier and the routing of wires to both sides of the barrier. Another technique proposes the use of a pressure sensitive surface disposed along a leading edge of the movable barrier itself to facilitate detection of an obstacle through contact with that obstacle. This technique requires that the object being protected be impacted for the protection can occur. Therefore with this technique presents a possibility that the protection only limits the damage and does not eliminate it.

BRIEF DESCRIPTION OF THE DRAWINGS

The above needs are at least partially met through provision of the method and apparatus for using optical signal time-of-flight information to facilitate obstacle detection described in the following detailed description, particularly when studied in conjunction with the drawings, wherein.

Figure 1:
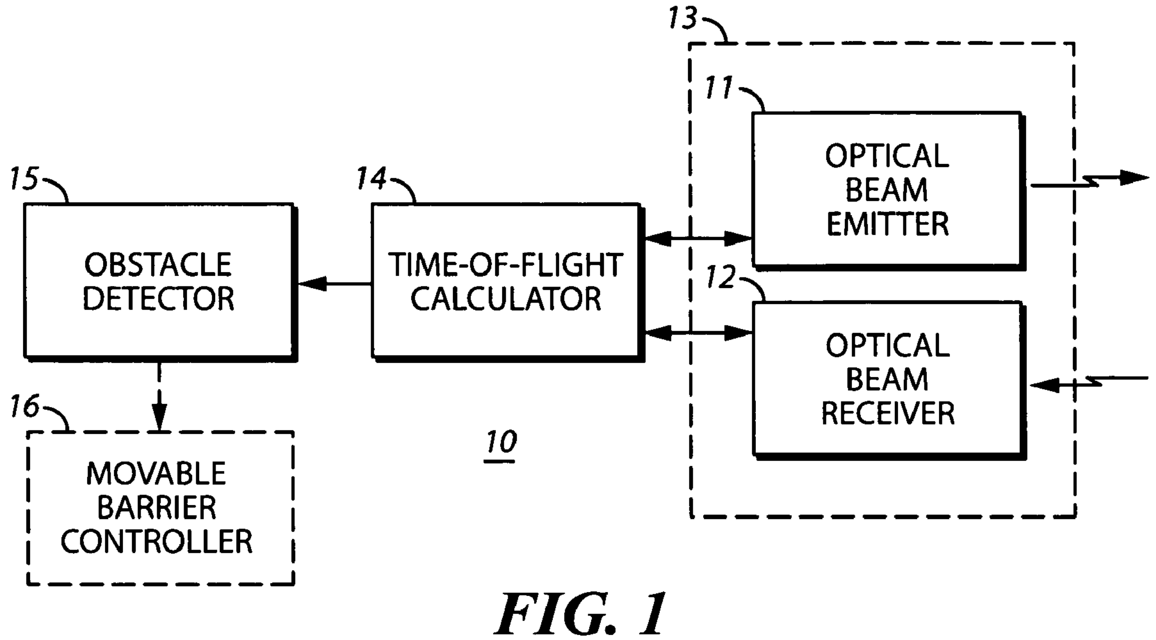
FIG. 1 comprises a block diagram as configured in accordance with various embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is usually accorded to such terms and expressions by those skilled in the corresponding respective areas of inquiry and study except where other specific meanings have otherwise been set forth herein.

DETAILED DESCRIPTION

Generally speaking, pursuant to these various embodiments, one or a plurality of optical signals are sourced wherein with the plurality at least some of the optical signals are at different angles of travel from one another and at least some of the plurality of optical signals are directed towards an area comprising a movable barrier-controlled point of passage. Reflections of these optical signals are detected and used to determine a time-of-flight for at least one of the optical signals. These embodiments then use that time-of-flight information to detect a likely presence of an obstacle in the pathway of a corresponding movable barrier.

Depending upon the needs of a given application, the optical signals are sourced by a plurality of optical signal emitters or by a single optical signal emitter (when employing, for example, a movable optical signal emitter or an optical signal pathway adjuster such as a movable reflective surface or as a direct replacement for present day photobeam systems). These optical signals can be sourced from a substantially common area (such as, but not limited to, an upper corner of a movable barrier passageway) or can be sourced from a plurality of areas that are substantially distal from one another. In a preferred embodiment at least some of these optical signals are directed towards a physical boundary that serves to define, at least in part, a periphery or boundary of the movable barrier passageway. For example, such optical signals can be usefully directed towards a floor surface and/or a sidewall of such a passageway.

Such time-of-flight information can serve to not only indicate the presence of an obstacle but can also, if desired, provide other useful information. For example, such time-of-flight information can serve to facilitate a determination regarding a size of the obstacle. This information, in turn, can serve to facilitate a determination regarding whether the obstacle is smaller than a predetermined size and hence whether the detected obstacle in fact presents a genuine concern meriting an operational response.

These and many other benefits may become more evident upon making a thorough review and study of the following detailed description.

Referring now to the drawings, and in particular to FIG. 1, an illustrative embodiment of a movable barrier operator 10 configured and arranged in accord with these teachings includes an optical beam emitter 11 and an optical beam receiver 12. These elements 11 and 12 can be deployed as discrete components (as suggested by the illustration) or as an integral platform 13.

Figure 2:
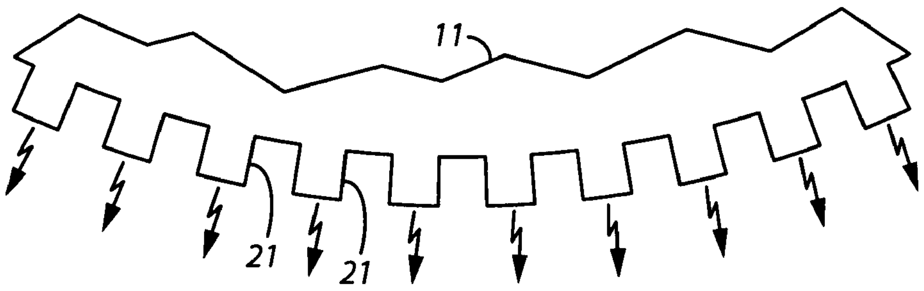
FIG. 2 comprises a detail schematic view as configured in accordance with various embodiments of the invention.

Viewed generally, the optical beam emitter 11 can comprise an output that provides a plurality of non-coaxially aligned optical beams. The optical beams themselves are preferably laser beams as are well understood in the art, but other types of optical emitters could also be employed if desired and as may better suit the needs of a given application. Pursuant to one approach, the optical beam emitter 11 comprises a plurality of discrete optical beam emitters such as the discrete optical beam emitters 21 depicted in the illustration provided at FIG. 2. In this illustrative embodiment, the multiple discrete optical beam emitters 21 are radially oriented with respect to a curved surface such that the resultant optical beams in fact issue at other than in a parallel alignment with one another. By this approach, a plurality of so-oriented laser emitters 21 serve to source the plurality of non-coaxially aligned optical beams.

Figure 3:
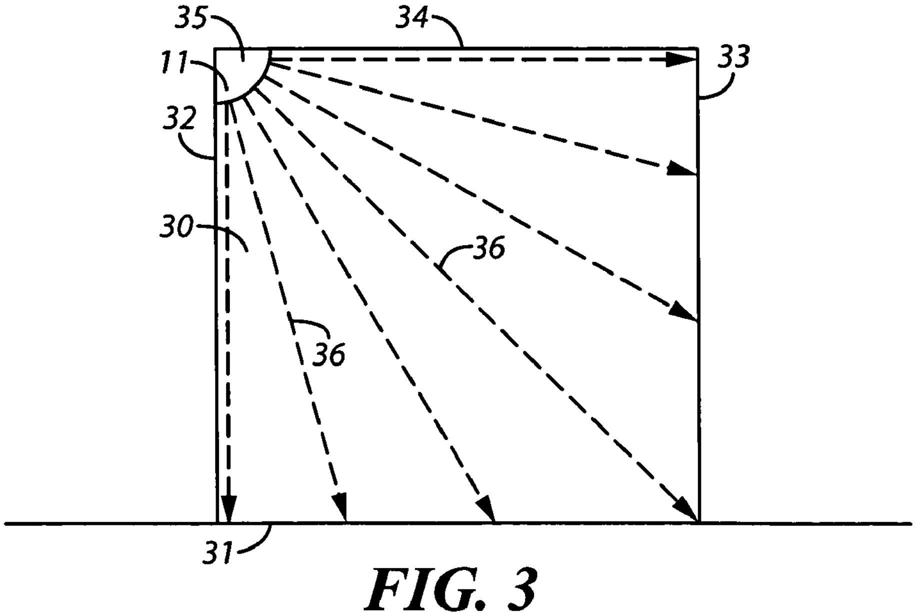
FIG. 3 comprises a side elevational schematic view as configured in accordance with various embodiments of the invention.

Pursuant to one approach, and referring momentarily to FIG. 3, at least some of this plurality of optical signals are directed towards an area comprising a movable barrier-controlled point of passage 30. More particularly, and pursuant to a preferred approach, at least some of these optical signals are directed towards one or more areas that comprise a boundary area for the movable barrier-controlled point of passage 30. For example, when the movable barrier comprises a garage door and the movable barrier-controlled point of passage 30 comprises a garage opening defined in general by a floor surface 31, two sidewalls 32 and 33, and an upper surface 34, the optical signals 34 can be usefully directed towards a floor surface 31 (or other surface that is proximal to a fully closed position for the movable barrier), a sidewall 33 of the passage 30, or such other surface (or combination of surfaces) as may prove useful in a given application.

Providing the optical signals in a non-parallel deployment offers numerous advantages. For example, this permits considerable latitude with respect to locating the optical beam emitter 11 itself. In this particular illustrative example, the optical beam emitter 11 has been located in an area comprising a corner 35 (and more particularly an upper corner) of the passageway 30. Other locations can be used as well with some alternatives being depicted herein.

Figure 4:
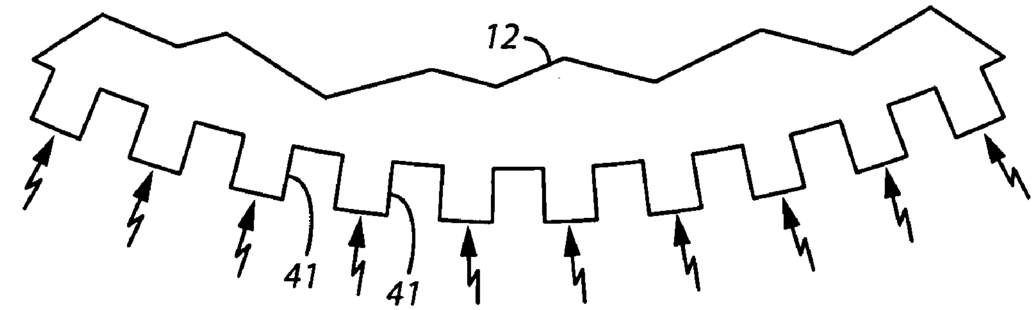
FIG. 4 comprises a detail schematic view as configured in accordance with various embodiments of the invention.

The optical beam receiver 12 is generally positioned to receive reflections of the non-coaxially aligned optical beams. With momentary reference to FIG. 4, the optical beam receiver 12 can comprise, if desired, a plurality of discrete optically sensitive receivers 41 such as prior art reception devices that are sensitive and responsive to the laser's wavelength of energy. Pursuant to one approach and as suggested by the illustrative embodiment depicted in FIG. 4, these optically sensitive receivers 41 may essentially correspond to the spacing, alignment, and placement of a corresponding plurality of discrete optical beam emitters 21 as described above with respect to FIG. 2. By juxtaposing such a grouping of emitters 21 and receivers 41 in close proximity to one another, and depending upon the reflective properties attending a given passageway, the receivers 41 may be usefully placed to detect sufficient reflective information regarding the optical beams sourced by the emitters 21 to meet the needs of these teachings as are described below in more detail. (Numerous other configurations are of course possible and may possibly be preferable in a given setting.

Figure 5:
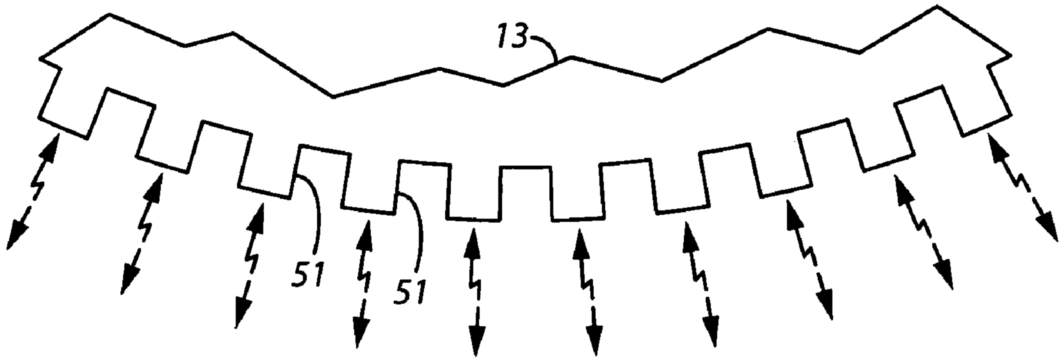
FIG. 5 comprises a detail schematic view as configured in accordance with various embodiments of the invention.

As one illustrative example, and referring momentarily to FIG. 5, a given unified platform 13 may include both optical signal emitters and receivers 51 in very close relationship to one another. Or, if desired, the emitters and receivers may alternate ever other node in such an embodiment. As yet another example, it may be desirable to dispose some or all of the receivers 12 at some distance from the emitters 11 (in order to accommodate, for example, a situation when the surfaces that define the boundaries of the passageway are such that reflections of the optical signals do not reliably return to the general area of origination with sufficient energy to permit reliable detection thereof).)

Figure 6:
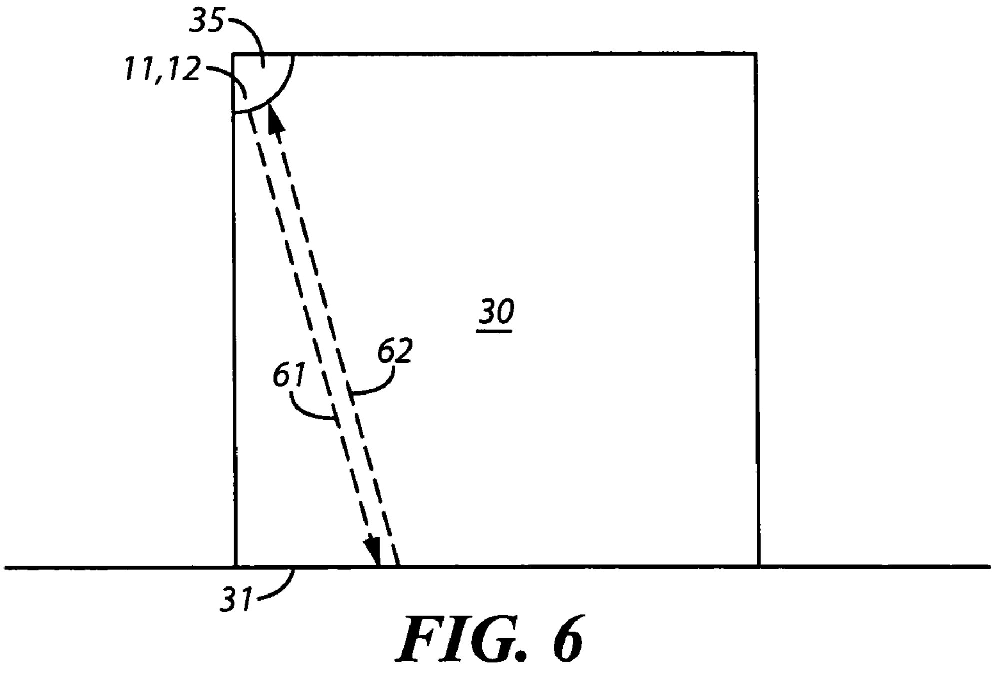
FIG. 6 comprises a comprises a side elevational schematic view as configured in accordance with various embodiments of the invention.

To illustrate this point, refer momentarily to FIG. 6. For purposes of clarity, only a single optical signal 61 is shown. This optical signal 61 travels towards a specified boundary of the passageway 30 (in this illustration, that boundary comprises the floor 31), makes contact with that surface, and reflects therefrom. In many cases, this reflection comprises at least a portion 62 that returns relatively proximal to the point of origin with sufficient energy to permit its reliable detection. As will be described below in more detail, this permits determining a time-of-flight for such an optical signal 61 and its reflection 62 by determining a duration of time between the original sourcing of the optical signal to a time of detecting its corresponding reflection.

Figure 7:
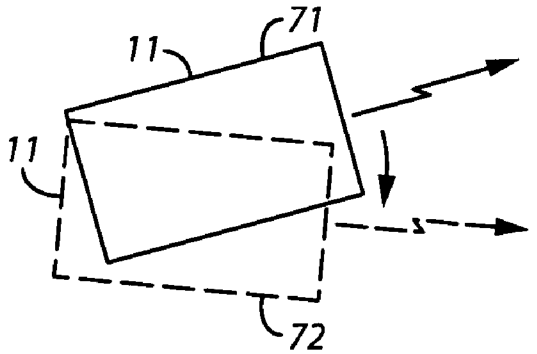
FIG. 7 comprises a schematic view of a movable optical signal emitter as configured in accordance with various embodiments of the invention.

In the embodiments described above, the plurality of optical signals are owing to a corresponding plurality of emitters. If desired, however, some or all of this plurality of signals can be sourced by a single optical beam emitter 11. Pursuant to one approach, and referring momentarily to FIG. 7, this single optical beam emitter 11 can comprise a movable optical beam emitter 11 as is known in the art. By sourcing optical signals in synchronicity with various positions of the movable optical beam emitter 11, a corresponding plurality of non-coaxially aligned optical beams will result. For example, the optical signal that will issue when the movable optical beam emitter 11 assumes a first orientation 71 with respect to a pivoting axis will have a different angle of flight than the optical signal that will issue when the movable optical beam emitter 11 assumes a second orientation 72 with respect to that pivoting axis.

Figure 8:
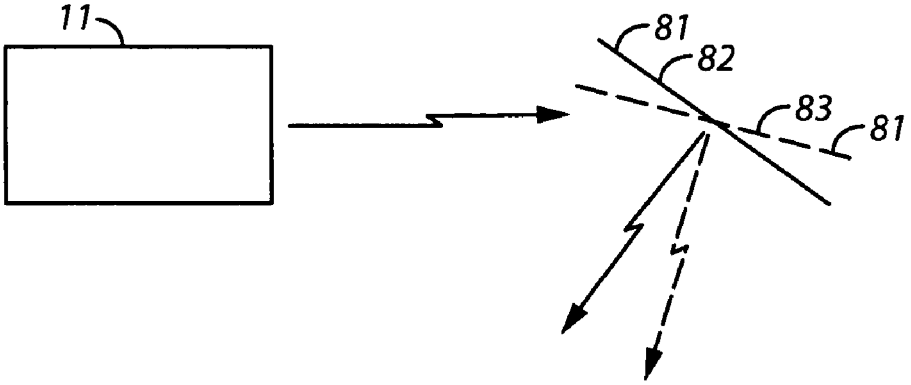
FIG. 8 comprises a schematic view of a non-moving optical signal emitter as configured in accordance with various embodiments of the invention.

As another illustrative example, and referring momentarily to FIG. 8, a single optical beam emitter 11 may be stationary but its light beams may impinge upon an optical signal pathway adjuster 81 (such as, for example, a reflective surface such as a flat or curved mirror surface). By selectively moving this optical signal pathway adjuster 81, the resultant reflections can exhibit non-corresponding angles of reflection and hence non-corresponding pathways to the boundary surfaces of the passageway. For example, as illustrated, a reflected light beam as corresponds to a first position 82 of the optical signal pathway adjuster 81 proceeds at a different angle as compares to a reflected light beam that corresponds to a second position 83 of the optical signal pathway adjuster 81.

Figure 9:
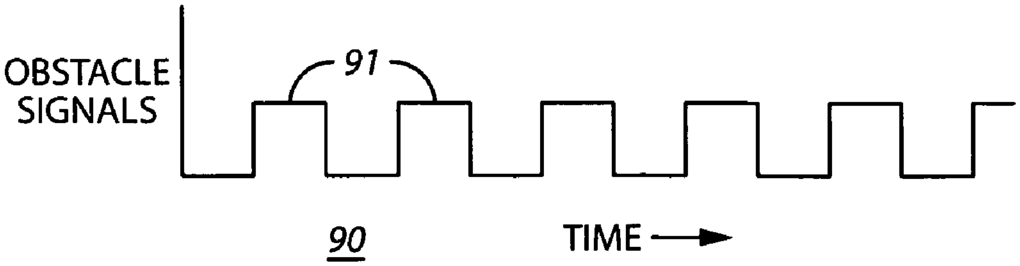
FIG. 9 comprises a timing diagram as configured in accordance with various embodiments of the invention.

When using a single optical signal emitter, it will typically be preferred to pulse the emitter to thereby cause emission of a series of light pulses. For example, and referring momentarily to FIG. 9, a series 90 of optical signals 91 may be sourced over time, with each pulse varying with respect to its ultimate angle of travel with respect to the passageway. The duration of such periodic optical signals and/or the periodicity itself can and likely will vary with the needs and/or capabilities of a given setting and platform choice.

These and other optical signal emitters and receivers are known in the art, and others will likely be developed in the future. Because such devices and their manner of deployment and use is well understood, and further because the present teachings are not particularly sensitive to the use of any specific technology or methodology in this regard, for the sake of brevity no further elaboration will be provided here.

Referring again to FIG. 1, the optical beam emitter 11 and the optical beam receiver 12 are operably coupled to a time-of-flight calculator 14. In a preferred embodiment, the time-of-flight calculator 14 has an optical beam pathway time-of-flight value output for each of a plurality of individual optical beams and their corresponding reflections. This may preferably include a calculation capability that facilitates determination of a duration of time from when a given one of the plurality of non-coaxially aligned optical beams is sourced by the optical beam emitter 11 and when a reflection as corresponds to that given one of the plurality of non-coaxially aligned optical beams is detected by the optical beam receiver 12.

The time-of-flight calculator 14 in turn operably couples to an input of an obstacle detector 15. This obstacle detector 15 serves, in a preferred embodiment, to use the optical beam pathway time of flight values from the time-of-flight calculator to determine when an obstacle is likely in the path of a movable barrier. This can include, pursuant to at least one approach, a determination of whether a given sensed obstacle is of sufficient size (and/or is present for a sufficient length of time) to warrant altering operation of a corresponding movable barrier. The obstacle detector 15 then typically operably couples to a movable barrier controller 16 as is well understood in the art. The latter can then make use of the obstacle detection information to effect a corresponding response strategy of choice.

For purposes of explanation, the time-of-flight calculator 14, the obstacle detector 15, and the movable barrier controller 16 are depicted as being discrete elements. In fact, if desired, a given embodiment can comprise such an architecture. More typically, however, the movable barrier controller 16 for a given movable barrier operator 10 will comprise a partially or wholly programmable platform. In such a configuration, it may be desirable and appropriate to include the described functionality of the time-of-flight calculator 14 and the obstacle detector 15 in the platform that comprises and supports the movable barrier controller 16 as well. Such architectural options will be well understood by those skilled in the art and merit no further elaboration here.

The embodiments described above will serve to effect the teachings set forth below, though it will be understood that the following process(es) can likely be readily implemented via other enabling platforms as well, and that the scope of their teachings should not be considered as being limited to the illustrative options presented in the preceding materials.

Figure 10:
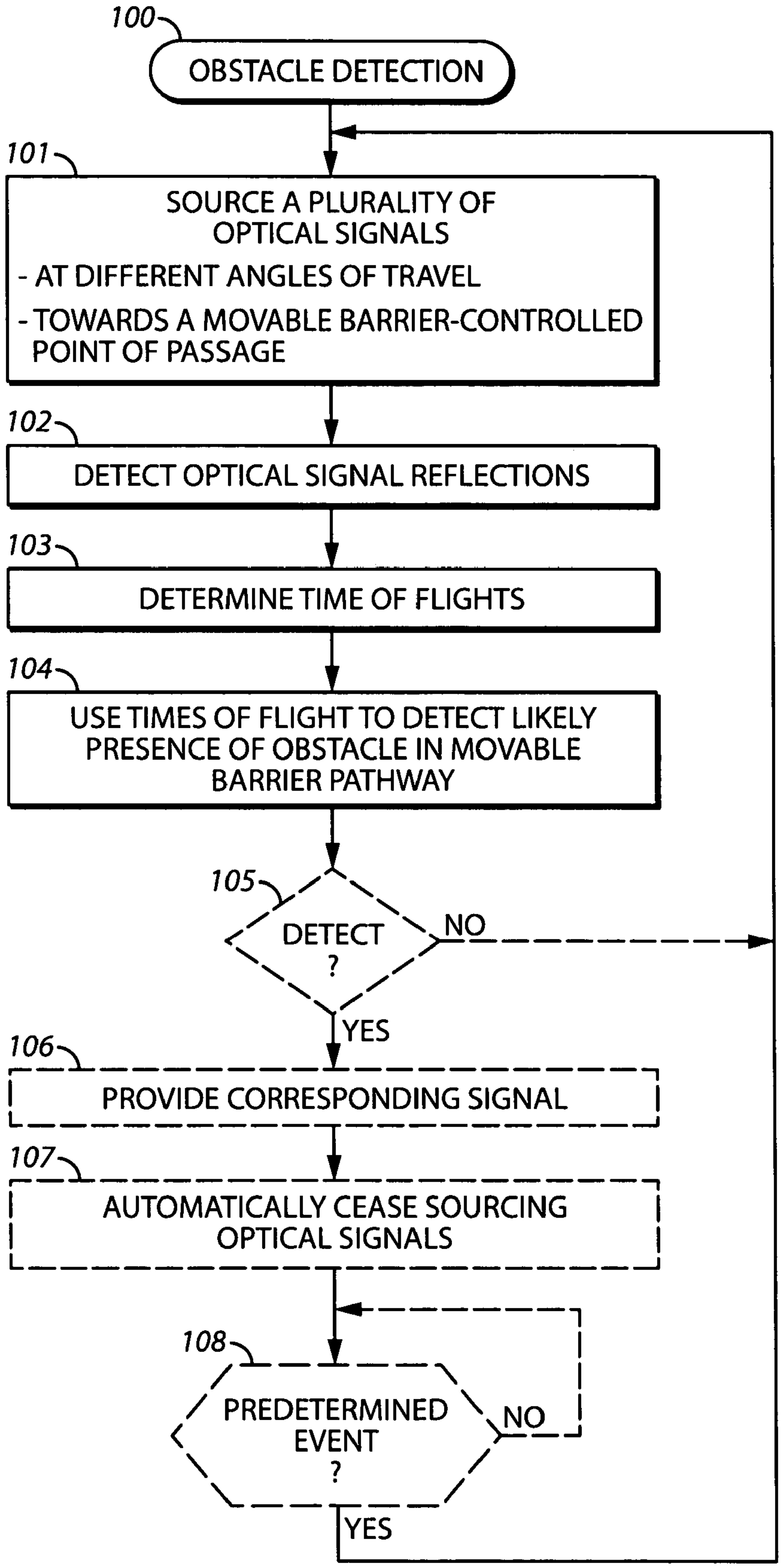
FIG. 10 comprises a flow diagram as configured in accordance with various embodiments of the invention.

Referring now to FIG. 10, a process 100 for effecting obstacle detection can first comprise sourcing 101 a plurality of optical signals, wherein at least some of the plurality of optical signals are at different angles of travel from one another and at least some of the plurality of optical signals are directed towards an area that comprises a movable barrier-controlled point of passage. As noted earlier, this plurality of optical signals can be sourced from a first location (or at least form a substantially common area) from an area that is proximal to a boundary of the passageway such as an upper corner of a garage door opening.

Figure 11:
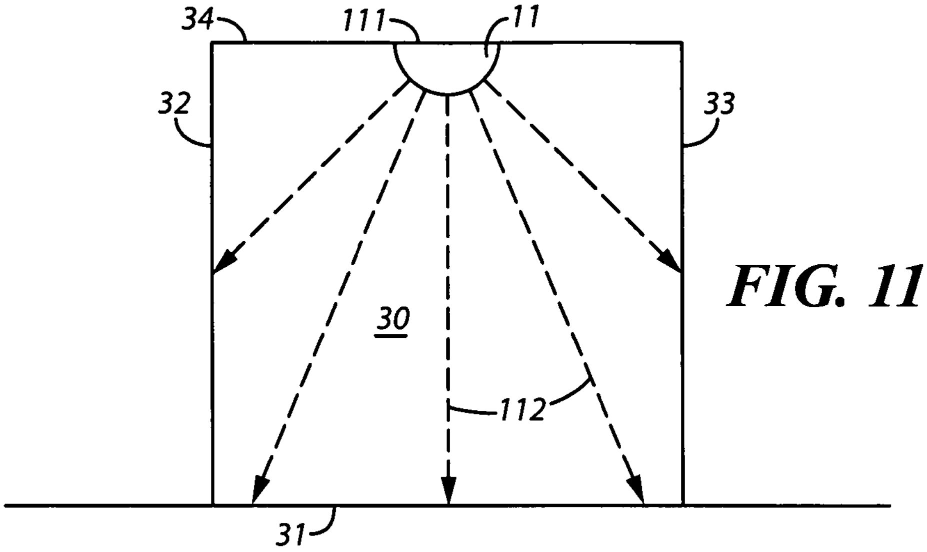
FIG. 11 comprises a side elevational schematic view as configured in accordance with various embodiments of the invention.

For example, as illustrated in FIG. 11, the optical signal emitter(s) 11 can be disposed in a substantially common area that comprises a substantially central position 111 with respect to the passageway 30 such as a central position 111 in an upper position proximal to the upper boundary 34. So positioned, optical beams 112 are readily directed towards various areas that comprise the movable barrier-controlled point of passage 30 including the floor 31 and sidewalls 32 and 33 thereof.

Figure 12:
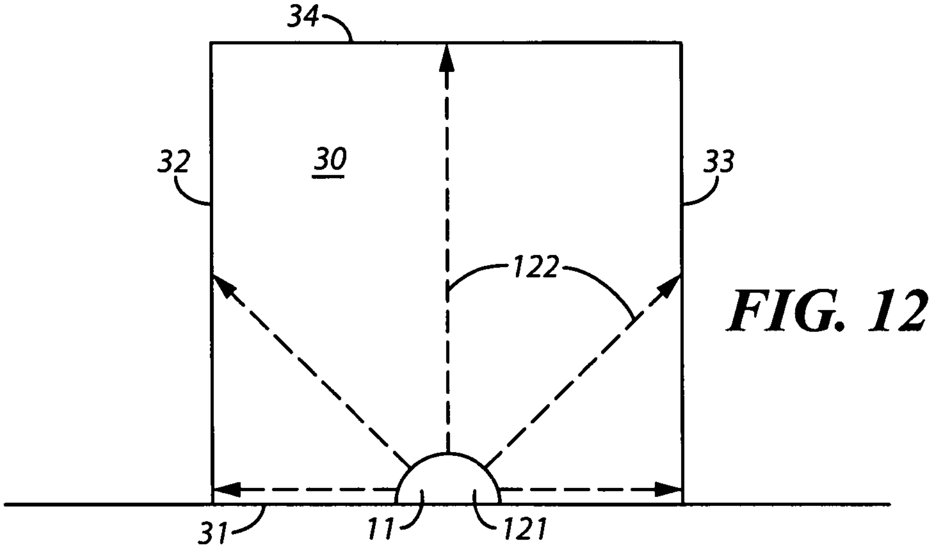
FIG. 12 comprises a side elevational schematic view as configured in accordance with various embodiments of the invention.

As yet another illustrative example, and referring momentarily to FIG. 12, the optical signal emitter(s) 11 can be disposed in a substantially common area that comprises a lower position 121 proximal to the lower boundary 31. So positioned, optical beams 122 are again readily directed towards various areas that comprise the movable barrier-controlled point of passage 30 including the floor 31 and both sidewalls 32 and 33. The particular position selected for a given application may of course depend up numerous factors that are not necessarily relevant to these teachings. For example, a floor-mounted installation may not be appropriate in a setting where occluding materials (such as snow or dirt) may be expected on a regular basis and available maintenance will be unlikely to assure its timely removal.

Figure 13:
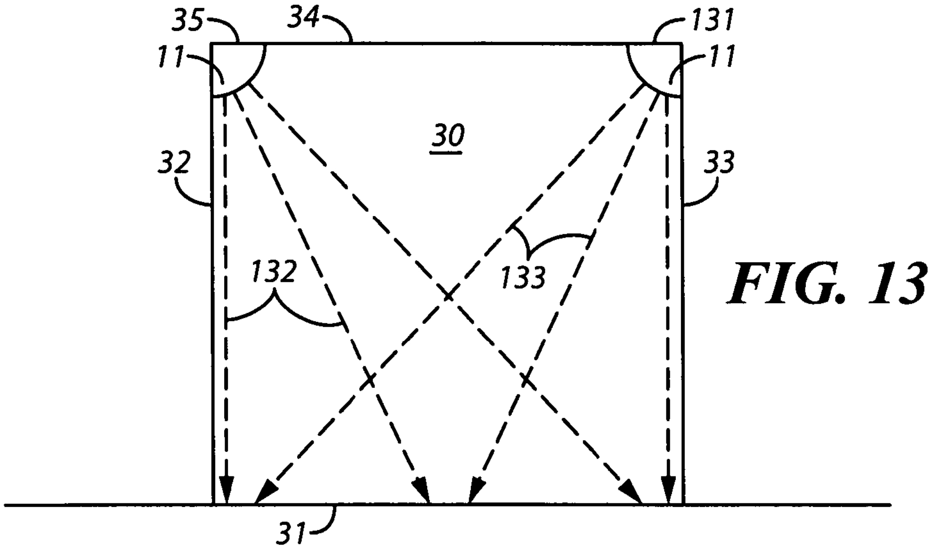
FIG. 13 comprises a side elevational schematic view as configured in accordance with various embodiments of the invention.

In the examples provided above, the optical signals are sourced, at least for the most part, from a substantially common area. If desired, however, such optical signals can be sourced from more than one such location. For example, such optical signals can be sourced from both a first and a second location, wherein the second location is distal to the first location. For example, and referring momentarily to FIG. 13, some optical beams 132 can be sourced from a first area such as a first corner 35, of the passageway 30 and other optical beams 133 can be sourced from a second area such as a second corner 131 that is different from the first corner 35 and that, in this illustrative embodiment, comprises a corner 131 on the opposite side of the movable barrier-controlled point of passage 30 from the first corner 35.

Regardless of whether such optical signals emanate from a single substantially common area or are sourced from a plurality of discrete areas distally positioned with respect to one another, these optical signals may be sourced from an area that is external to the passageway, internal to the passageway, or both. In either case, it will likely be preferable to source these optical signals from an area that is relatively proximal to the passageway itself, but for some applications it may be desirable to initiate beam travel from a more distal position.

Also regardless of whether such optical signals are sourced from a common area or from separated multiple areas, and further regardless of whether the optical beam emitter 11 comprises a single emitter or a plurality of emitter devices, it may be desirable for some applications to facilitate an ability to distinguish one optical signal from another. For example, it may be possible or even likely under some operating conditions or by some installation constraints that a given receiver 12 will be able to detect more than one optical signal (or, more correctly, the reflections as correspond to more than one optical signal). This, in turn, can lead to potential ambiguity regarding which reflection corresponds to which optical signal (particularly when optical signals are continually sourced in parallel with one another and/or when pulsed optical signals are pulsed with a relatively rapid periodicity).

Therefore, if desired, at least some of the optical signals can be provided with a unique identifying indicia that, when detected, permits identifying a given one of the reflections as corresponding to a specific one of the plurality of optical signals. For example, each optical signal can comprise a unique wavelength and the receivers 12 can be filtered and/or otherwise configured and arranged to only likely respond and detect a particular optical signal wavelength. As another illustrative example, some or all of the optical signals can be combined with one or more unique modulation characteristics. Upon detecting and/or decoding each reflection to ascertain the presence and nature of such modulation characteristics, a determination can be made regarding the respective identity of some or all of the optical signals.

Referring again to FIG. 10, the obstacle detection process 100 then detects the reflections of at least some of the plurality of optical signals. More particularly, this process 100 detects reflections of the optical signals from the boundary surfaces of the passageway and/or from an obstacle or other object as may be present within the passageway. Upon detecting such reflections, the process 10 can readily determine 103 a time-of-flight for at least some of the optical signals which time-of-flight comprises a duration of time that begins with origination of the optical beam and reception of the reflection of the optical beam (it is possible that under some operating circumstances, more than one reflection of a given optical signal will reach a given receiver due to multiple reflections off of various available surfaces in the area of the passageway; under such circumstances it will usually be preferable to utilize a first received reflection and to essentially ignore other subsequent reflections of a given optical signal).

This time-of-flight information then informs a process to detect 104 a likely presence of an obstacle in the pathway for a movable barrier. Such a detection process 104 will typically benefit from a use of historical information. That is, the detection process can make good use of time-of-flight information as corresponds to particular optical signals (with respect to their point and/or relative time of origin) during conditions when no obstacles are present. Such historical information can then be used as a point of comparison with presently available time-of-flight information. When present information includes times-of-flight that are shorter in duration than the corresponding historical data, a determination can be drawn that an obstacle is now likely present, as the obstacle is now causing an earlier reflection of the optical beam than would ordinarily occur.

Figure 14:
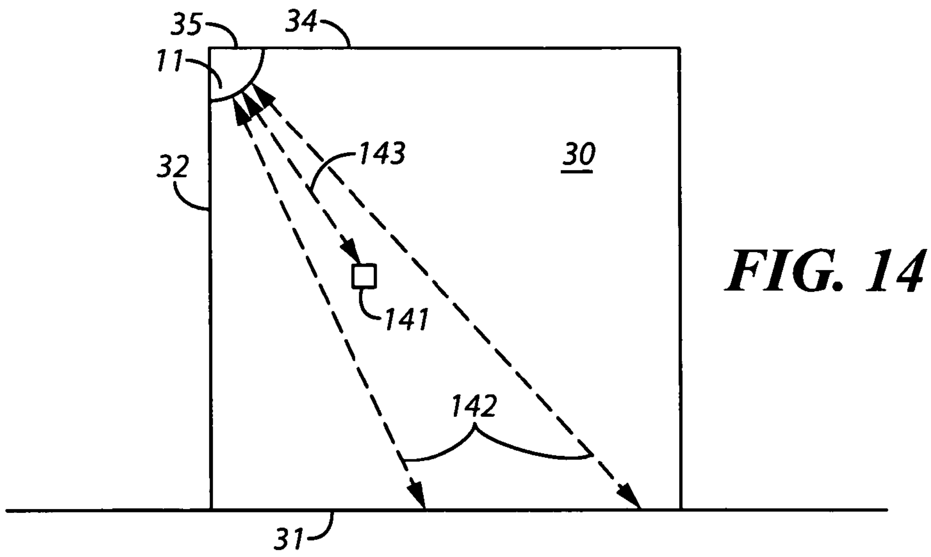
FIG. 14 comprises a side elevational schematic view as configured in accordance with various embodiments of the invention.
Figure 15:
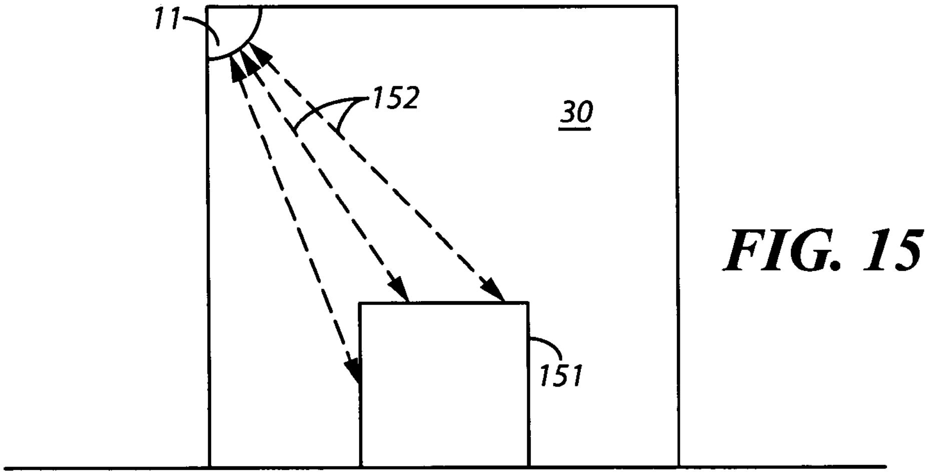
FIG. 15 comprises a side elevational schematic view as configured in accordance with various embodiments of the invention.

In addition to being usable to detect the presence of an obstacle, such time-of-flight information for a plurality of optical signals can also serve to permit a determination regarding a size of the obstacle (or obstacles). For example, and referring momentarily to FIG. 14, when a relatively small object 141 (such as a small leaf) comprises the detected obstacle, most of the optical signals 142 will miss the object 141 and produce only an expected reflection and only a few optical signals 143 will actually impinge upon the object 141 and produce a reflection bearing a shortened time-of-flight. By noting how many of the optical signals effectively detect the obstacle, a ready determination can usually be drawn regarding the size of the object itself. As another illustrative example, and referring now momentarily to FIG. 15, a larger object 151 will cause an earlier reflection of a relatively larger number of optical signals 152. This relatively larger number of optical signals that will give rise to a larger number of reduced time-of-flight values can serve to indicate the presence of a larger obstacle.

Such information can be employed by the process 100 to optionally detect 105 whether a sufficiently sized obstacle is present that warrants being identified as an "obstacle." Sufficiently small objects, such as a snowflake or leaf, may be safely ignored under at least some operating circumstances while larger objects may warrant recognition as an obstacle that requires a corresponding response. (Note that much the same analysis and consideration can be provided with respect to the temporal presence of an object in the passageway of a movable barrier; i.e., an object that is only present for a brief moment of time may not warrant a response under at least some operating conditions, or at least may only warrant a tempered response as versus a universal stop and/or stop-and-reverse response.)

Upon detecting an obstacle (and particularly upon detecting an obstacle of concern such as a large object), the process 100 can provide 106 a corresponding signal. This signal can be recorded in a historical data record if desired and will usually be provided to a corresponding movable barrier controller to permit an appropriate response by the latter. For example, upon detecting an obstacle, it may be appropriate to effect an automatic stopping or reversal of a presently moving movable barrier. Or, when the movable barrier is not presently moving, a warning tone or other signal may be provided to provide an alert that an obstacle is presently in the pathway of the movable barrier.

Concentrated light may pose varying degrees of irritation risk according to the intensity. It may therefore be helpful and/or appropriate to optionally provide for an automated cessation 107 of the sourcing of the optical signals upon detecting an obstacle. So configured, the process 100 can at least ameliorate risk of irritation of an individual person or animal when the detected obstacle in fact comprises a person or animal such as a pet. Resumption of optical signal emissions can begin on an automated basis or can require manual resetting by an operator (for example, through assertion of a corresponding user interface such as a reset switch) or some other predetermined event 108, depending upon the requirements of a given application.

So configured, a movable barrier operator that controls a movable barrier with respect to a position of the movable barrier within a passageway having one or more physical boundaries can effect and control or at least be informed by the sourcing of a plurality of optical beams (wherein at least some of the plurality of optical beams are non-coaxial with respect to one another and are directed towards the at least one physical boundary) by detecting paths of travel for corresponding ones of at least some of the optical beams, which paths of travel each comprise an original optical beam and at least one reflection thereof. A time-of-flight for at least some of these paths of travel is then determined and used to detect a likely presence of an obstacle in the passageway. Such an approach can be used with various movable barriers and passageways including but not limited to garage doors and their corresponding garage door openings, a barrier gate, and so forth.

There are times, of course, when obstacle detection does not comprise a primary concern. For example, the movable barrier of interest may be fully closed. In such a state, the odds are usually remote that an obstacle may become inadvertently placed in the pathway of the movable barrier. During such times it may be desirable to manipulate at least one of the plurality of optical signals to facilitate a display of at least one cosmetic element on a surface such as the movable barrier itself as optical beams, and particularly movable laser beams, are well understood in the art to be manipulable in this fashion.

Figure 16:
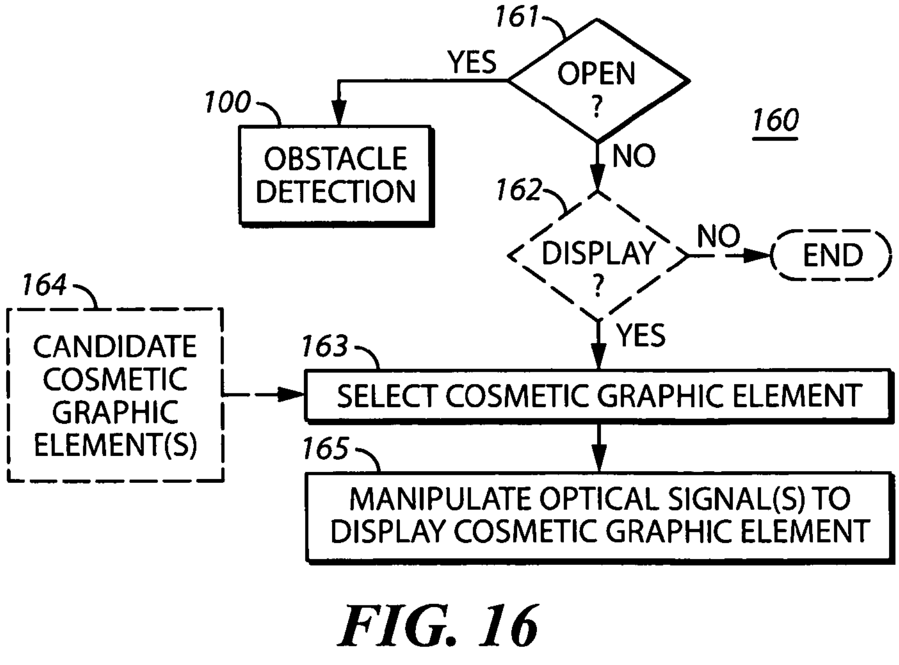
FIG. 16 comprises a flow diagram as configured in accordance with various embodiments of the invention.

Referring now to FIG. 16, a corresponding process 160 can ascertain 161 from time to time or pursuant to such other trigger criteria as may be appropriate in a given setting whether the movable barrier of interest is open to some degree of concern. When true, the process 160 can continue with an obstacle detection process 100 such as that described above. When not true, however, the process 160 can effect provision of one or more cosmetic elements as suggested above. This process 160 can optionally include a determination 162 regarding whether a user has selected such a display mode (for example, through appropriate manipulation and assertion of a corresponding user interface). When a user has selected, given the opportunity, to not effect a cosmetic display process, the process 160 can simply conclude for the moment.

Figure 17:
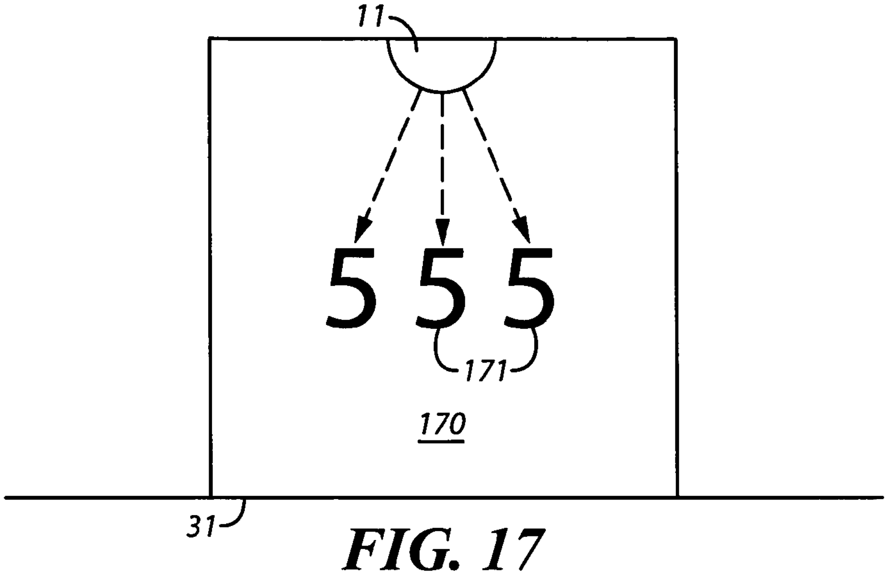
FIG. 17 comprises a side elevational schematic view as configured in accordance with various embodiments of the invention FIG. 18 comprises a side elevational schematic view as configured in accordance with various embodiments of the invention.

When selected, however, the process 160 can select 163 a given cosmetic graphic element (as selected, for example, from amongst a plurality of candidate cosmetic graphic elements 164) and effect corresponding manipulation 165 of one or more of the optical signals to display the selected cosmetic graphic element. To illustrate this concept, and referring now to FIG. 17, an exterior mounted emitter 11 can effect such optical signal manipulation to cause the display of, for example, a street address number 171 onto the exterior surface of a movable barrier 170 such as a garage door.

Such a cosmetic graphic display can be realized in any number of ways as will be understood by those skilled in the art. In a preferred approach, and particularly when the optical beam emitter 11 comprises at least one movable laser beam emitter, the pulsing and tracking of the resultant beam can be suitably controlled in accordance with well understood prior art technique to yield such a display. It would also be possible to utilize movable or otherwise selectable sources, filters, screens, and so forth to yield a corresponding display of interest.

The cosmetic graphic elements themselves can be many and varied as desired and/or as appropriate to the needs of a given application. The elements can include fully or partially alphanumeric content (such as a partial or complete street address, a personal greeting to an expected visitor or passersby, a seasonal greeting, and so forth) and/or pictorial content (such as a seasonal depiction, a sports team logo, a depiction as correlates to a hobby interest, and so forth). The candidates can comprise a set selection or can be rendered exchangeable and/or downloadable or otherwise upgradable as desired and in accord with well understood prior art technique. It would also be possible, presuming the provision of a suitable user interface, to permit a user the opportunity and ability to create, edit, or otherwise modify such display content.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, gradual partial attenuation of the strength of a received reflection over time may be noted and compared against one or more threshold values to permit detection of when maintenance may be advisable. Upon detecting a suitably partially attenuated signal pathway, for example, a signal can be provided to an operator to clean or otherwise service the emitter and/or receiver. As another example, when employed with a movable barrier such as a sliding or pivoting gate, it is possible that there will be no reflections for at least some optical signals. For example, when the optical signals are aimed upwardly in an exterior setting, some or all of the optical signals may simply continuing moving upwards into the sky in the absence of an obstacle to cause their reflection. In such a setting these teachings can be modified as appropriate to accommodate and accept the possibility that no reflection may occur by, for example, concluding a time-of-flight calculation for a given optical signal once a particular time limit has been reached. This same accommodation can be used in other settings where, for whatever reason, a reflection may not be expected for some or all of the optical signals during normal operations.

Figure 18:
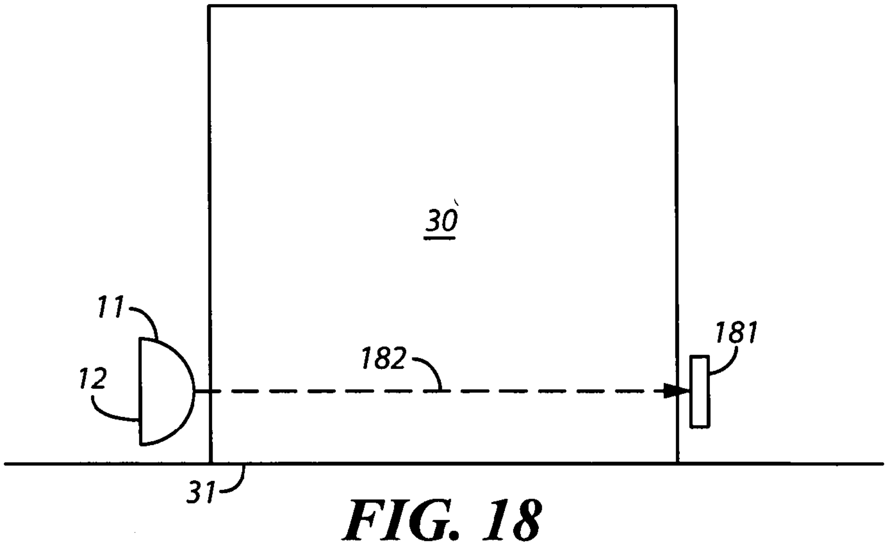

As yet another example, the descriptions provided above employ a plurality of optical beams. These same teachings can also be deployed in a simpler design of the system that utilizes only a single optical beam. To illustrate, and referring now to FIG. 18, a single beam optical beam emitter 11 and a corresponding optical beam receiver 12 are located just above the floor 31. A reflector 181, such as a mirrored surface, is positioned opposite the optical beam emitter 11 such that a light beam 182 traversing the movable barrier opening 30 will reflect from the reflector 181 and at least a part of a reflected optical beam will return to the optical beam receiver 12. By measuring the corresponding time-of-flight, the distance the optical beam has traveled and therefore the distance to an intervening object is again readily detected. Such a system could again record the normal distance to the reflector and store that value in memory. Then, during use, whenever the reflection distance it is less than the distance to the reflector the system can interpret this reading as indicating that an object is within the movable barrier opening 30.

Figure 19:
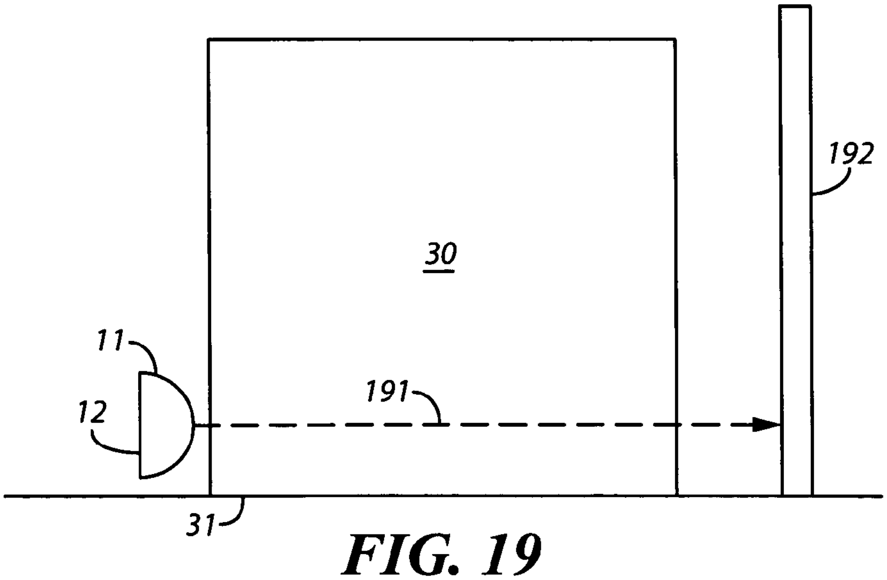
FIG. 19 comprises a side elevational schematic view as configured in accordance with various embodiments of the invention.

In alternative embodiment, and referring now to FIG. 19, the reflector can be removed from the system. This approach works in a similar manner as described earlier with an optical beam 191 being emitted from optical beam emitter 11. The optical beam 191 then travels across the opening 30. The system is trained to essentially ignore any reflections that occur at a distance greater then the opening's distance. Such training can occur in various ways. As one example, one might simply set a specific distance for the opening as a user-calibrated setting. As another example, the system could assess a measurement to a nearest opposing wall 192 as a calibration point and then back off from that distance to establish a viable obstacle-detected range.

We claim:

1. A method comprising:

sourcing a plurality of optical signals, wherein:

at least some of the plurality of optical signals are at different angles of travel from one another;

at least some of the plurality of optical signals are directed towards an area comprising a movable barrier-controlled point of passage;

detecting reflections of at least some of the plurality of optical signals;

determining a time of flight for at least some of the optical signals;

using the time of flight to detect a likely presence of an obstacle in a pathway of the movable barrier.

2. The method of claim 1 wherein sourcing a plurality of optical signals further comprises sourcing the plurality of optical signals substantially in parallel with one another.

3. The method of claim 2 wherein sourcing the plurality of optical signals substantially in parallel with one another further comprises using a plurality of discrete optical signal emitters.

4. The method of claim 3 wherein using a plurality of discrete optical signal emitters further comprises using a plurality of discrete lasers.

5. The method of claim 1 wherein sourcing a plurality of optical signals further comprises:

emitting a plurality of optical signals from at least one optical signal emitter;

moving, over time, an angle of emission for at least some of the plurality of optical signals with respect to the movable barrier-controlled point of passage.

6. The method of claim 5 wherein emitting a plurality of optical signals from at least one optical signal emitter further comprises emitting a series of periodic optical signals from at least one optical signal emitter.

7. The method of claim 6 wherein moving, over time, an angle of emission for at least some of the plurality of optical signals with respect to the movable barrier-controlled point of passage further comprises moving the at least one optical signal emitter with respect to the movable baffler-controlled point of passage.

8. The method of claim 6 wherein moving, over time, an angle of emission for at least some of the plurality of optical signals with respect to the movable barrier-controlled point of passage further comprises moving an optical signal pathway adjuster with respect to the movable barrier-controlled point of passage.

9. The method of claim 8 wherein moving an optical signal pathway adjuster further comprises moving a reflective surface.

10. The method of claim 1 wherein sourcing a plurality of optical signals, wherein at least some of the plurality of optical signals are directed towards an area comprising a movable barrier-controlled point of passage further comprises sourcing a plurality of optical signals, wherein at least some of the plurality of optical signals are directed towards an area comprising at least one boundary area for the movable baffler-controlled point of passage.

11. The method of claim 10 wherein sourcing a plurality of optical signals, wherein at least some of the plurality of optical signals are directed towards an area comprising at least one boundary area for the movable barrier-controlled point of passage further comprises sourcing a plurality of optical signals, wherein at least some of the plurality of optical signals are directed towards a floor as corresponds to the movable barrier-controlled point of passage.

12. The method of claim 11 wherein the movable-barrier controlled point of passage comprises an opening to a garage.

13. The method of claim 1 wherein determining a time of flight for at least some of the optical signals further comprises determining a time of flight from a time of being sourced to a time of detecting the reflection thereof.

14. The method of claim 1 wherein using the time of flight to detect a likely presence of an obstacle in a pathway of the movable barrier further comprises using the time of flight as corresponds to a plurality of the optical signals.

15. The method of claim 14 wherein using the time of flight to detect a likely presence of an obstacle in a pathway of the movable barrier further comprises using the time of flight to determine a size of the obstacle.

16. The method of claim 14 wherein using the time of flight to detect a likely presence of an object in a pathway of the movable barrier further comprises determining how many of the optical signals so detect the obstacle to determine a size of the obstacle.

17. The method of claim 15 wherein using the time of flight to detect a likely presence of an obstacle in a pathway of the movable barrier further comprises providing an obstacle-detected signal in response to detecting a likely presence of an obstacle that is larger than a predetermined size and not providing the obstacle-detected signal in response to detecting a likely presence of an obstacle that is smaller than the predetermined size.

18. The method of claim 15 wherein using the time of flight to detect a likely presence of an obstacle in a pathway of the movable barrier further comprises providing an obstacle-detected signal in response to detecting a likely presence of an obstacle that is larger than a predetermined size and not providing the obstacle-detected signal in response to detecting a likely presence of an obstacle that is smaller than the predetermined size.

19. The method of claim 1 wherein sourcing a plurality of optical signals comprises sourcing a first plurality of optical signals from a first location.

20. The method of claim 19 wherein sourcing a plurality of optical signals further comprises sourcing a second plurality of optical signals from a second location, which second location is distal to the first location.

21. The method of claim 20 wherein the first location and the second location are each proximal to opposite sides of the movable barrier-controlled point of passage.

22. The method of claim 1 wherein detecting reflections of at least some of the plurality of optical signals further comprises detecting at least one indicia that identifies a given one of the reflections as corresponding to a specific one of the plurality of optical signals.

23. The method of claim 22 wherein the at least one indicia comprises a modulation characteristic.

24. The method of claim 1 and farther comprising, upon detecting a likely presence of an obstacle in a pathway of the movable barrier, automatically ceasing the sourcing of the plurality of optical signals.

25. The method of claim 24 wherein automatically ceasing the sourcing of the plurality of optical signals farther comprises automatically ceasing the sourcing of the plurality of optical signals for at least a predetermined period of time.

26. The method of claim 24 wherein automatically ceasing the sourcing of the plurality of optical signals farther comprises automatically ceasing the sourcing of the plurality of optical signals until detecting at least one predetermined event.

27. The method of claim 26 wherein detecting at least one predetermined event further comprises detecting assertion of a user interface.

28. The method of claim 1 and farther comprising:
detecting at least a partial attenuation of a pathway for at least one of the plurality of optical signals that does not likely correspond to the presence of an obstacle in a pathway of the movable barrier.

29. The method of claim 28 and further comprising:
providing a signal responsive to detecting the at least a partial attenuation of the pathway.

30. The method of claim 1 and further comprising:
manipulating at least one of the plurality of optical signals to facilitate a display of at least one cosmetic graphic element on a surface.

31. The method of claim 30 wherein the at least one cosmetic graphic element comprises at least a part of a street address.

32. The method of claim 30 wherein the surface comprises at least a part of the movable barrier.

33. A method for use with a movable barrier operator that controls a movable barrier with respect to a position of the movable barrier within a passageway, wherein the passageway has at least one physical boundary, comprising:
sourcing a plurality of optical beams, wherein:
at least some of the plurality of optical beams are non-coaxial with respect to one another;
at least some of the plurality of optical beams are directed towards the at least one physical boundary;
detecting paths of travel for corresponding ones of at least some of the optical beams, which paths of travel each comprise an original optical beam and at least one reflection thereof
determining a time of flight for at least some of the paths of travel;
using the time of flight to detect a likely presence of an obstacle in the passageway.

34. The method of claim 33 wherein the passageway comprises a garage door opening and the movable barrier comprises a garage door.

35. The method of claim 33 wherein the passageway comprises a gate opening and the movable barrier comprises a barrier gate.

36. The method of claim 33 wherein the physical boundary comprises a floor surface.

37. The method of claim 33 wherein the physical boundary comprises a surface that is proximal to a fully closed position for the movable barrier in the passageway.

38. The method of claim 37 wherein the surface comprises a sidewall of the passageway.

39. The method of claim 33 wherein sourcing a plurality of optical beams further comprises sourcing the plurality of optical beams using a plurality of optical beam emitters.

40. The method of claim 33 wherein sourcing a plurality of optical beams further comprises sourcing the plurality of optical beams using a single optical beam emitter.

41. The method of claim 33 wherein sourcing a plurality of optical beams further comprises sourcing the plurality of optical beams from a substantially common area.

42. The method of claim 41 wherein the substantially common area comprises an area that is proximal to a boundary of the passageway.

43. The method of claim 42 wherein the area comprises a corner of the passageway.

44. The method of claim 43 wherein the corner comprises an upper corner of the passageway.

45. The method of claim 33 wherein sourcing a plurality of optical beams further comprises sourcing at least one optical beam from a first area and at least one optical beam from a second area that is substantially distal to the first area.

46. The method of claim 45 wherein the first area and the second area are both proximal to a boundary of the passageway.

47. The method of claim 46 wherein the first area comprises a first corner of the passageway and the second area comprises a second corner of the passageway that is different than the first corner.

48. The method of claim 41 wherein the substantially common area further comprises a substantially central position with respect to the passageway.

49. The method of claim 48 wherein the substantially central position comprises an upper position with respect to the passageway.

50. The method of claim 48 wherein the substantially central position comprises a lower position with respect to the passageway.

51. The method of claim 41 wherein the substantially common area further comprises an area that is external to the passageway.

52. A movable barrier operator obstacle detector comprising:
an optical beam emitter having an output providing a plurality of non-c oaxially aligned optical beams;
an optical beam receiver positioned to receive reflections of the non-coaxially aligned optical beams;
a time-of-flight calculator that is operably coupled to the optical beam emitter and the optical beam receiver and having an optical beam pathway time of flight value output as corresponds to individual ones of the optical beams and their corresponding reflections;
an obstacle detector having an input operably coupled to the optical beam pathway time of flight value output.

53. The movable barrier operator obstacle detector of claim 52 wherein the optical beam emitter comprises a single optical beam emitter.

54. The movable barrier operator obstacle detector of claim 52 wherein the optical beam emitter comprises a plurality of discrete optical beam emitters.

55. The movable barrier operator obstacle detector of claim 52 wherein the optical beam receiver is positioned to facilitate detection of a reflection of the plurality of non-coaxially aligned optical beams from an obstacle in a path of a movable barrier.

56. The movable barrier operator obstacle detector of claim 52 wherein the time-of-flight calculator further comprises calculation means for determining a duration of time from when a given one of the plurality of non-coaxially aligned optical beams is sourced by the optical beam emitter and when a reflection as corresponds to the given one of the plurality of non-coaxially aligned optical beams is detected by the optical beam receiver.

57. The movable barrier operator obstacle detector of claim 52 wherein the obstacle detector further comprises means for using optical beam pathway time of flight values from the time-of-flight calculator to determine when an obstacle is likely in a path of a movable barrier.

58. The movable barrier operator obstacle detector of claim 57 wherein the means is further for determining when the obstacle is of sufficient size to warrant altering operation of the movable barrier.

59. The movable barrier operator obstacle detector of claim 57 wherein the means is further for determining when the obstacle is present for a sufficient length of time to warrant altering operation of the movable barrier.

* * * * *

UNITED STATES PATENT AND TRADEMARK OFFICE

CERTIFICATE OF CORRECTION

PATENT NO. : 7,221,288 B2
APPLICATION NO. : 10/972922
DATED : May 22, 2007
INVENTOR(S) : James J. Fitzgibbon et al.

It is certified that error appears in the above-identified patent and that said Letters Patent is hereby corrected as shown below:

IN THE CLAIMS:

Claim 7, Column 11, Line 45: Change “baffler-controlled” to -- barrier-controlled --;

Claim 10, Column 11, Line 65: Change “baffler-controlled” to -- barrier-controlled --;

Claim 24, Column 13, Line 1: Change “farther” to -- further --;

Claim 25, Column 13, Line 6: Change “farther” to -- further --;

Claim 26, Column 13, Line 11: Change “farther” to -- further --;

Claim 28, Column 13, Line 19: Change “farther” to -- further --;

Claim 33, Column 13, Line 49: After “thereof” insert a semi-colon -- ; --; and

Claim 52, Column 14, Line 49: Change “non-c oaxially” to -- non-coaxially --.

Signed and Sealed this

First Day of January, 2008

JON W. DUDAS
*Director of the United States Patent and Trademark Office*